Sept. 26, 1961 T. GRETHER 3,001,327
METHOD OF GROWING AND HARVESTING SUGAR CANE
Filed Oct. 12, 1959

TOBIAS GRETHER
INVENTOR.

BY Hazard & Miller
ATTORNEYS

United States Patent Office 3,001,327
Patented Sept. 26, 1961

3,001,327
METHOD OF GROWING AND HARVESTING SUGAR CANE
Tobias Grether, Rte. 2, Box 182A, Camarillo, Calif.
Filed Oct. 12, 1959, Ser. No. 845,900
4 Claims. (Cl. 47—58)

This invention relates to a method of growing and harvesting sugar cane and similar plants.

Explanatory of the present invention, sugar cane is conventionally grown in rows which rows are usually located in the bottom of ditches that are designed to hold or conduct irrigation water. In many parts of the continental United States where sugar cane is grown the climatic conditions are such that the sugar cane must be harvested before severe cold weather. Consequently, sugar cane grown under these conditions ordinarily does not grow to an excessive height before harvesting. In other localities, however, such as the Hawaiian Islands, the climatic conditions are such and the rainfall conditions are such that the sugar cane can be and usually is allowed to grow to an excessive height before harvesting. This unusually tall growth results in many cane stalks falling or toppling over. When this occurs the cane stalks are apt to fall in any direction sometimes falling in a direction more or less transverse to the length of the row in which it is located and toppling over or partially toppling over cane stalks in an adjacent row. In other instances, the cane stalks may fall in a direction lengthwise of the row in which it is located. The falling of the cane stalks is sometimes occasioned by wind but not necessarily so. When sugar cane grows to an excessive height, such as from eight to ten feet or higher, the tops of the stalks become very heavy with foliage and if the foliage is not evenly distributed it may grow to such a weight on one side of the stalk as to cause it to fall. Other circumstances may also contribute to the falling of the cane stalks. When the cane stalks fall in the various directions as above described for various reasons, some of which are suggested above, they render the harvesting of the sugar cane by harvest machinery extremely difficult with the result that a substantial amount of available sugar cane is lost. The falling of the sugar cane stalks also has a tendency to hamper visibility of the irrigator along the rows and tends to slow the flow of water through the irrigation ditches. Also, the fallen stalks hinder entry through rows for purposes of inspection and for purposes of rodent and disease control which are problems existing in the usual sugar cane fields.

An object of the present invention is to provide a method of growing and harvesting sugar cane wherein the cane stalks can be economically maintained in an upright position and held against toppling or falling over until immediately before harvesting. At that time the cane stalks are released and usually will maintain themselves in an upright position during the short period of time between release and actual harvest. As a result ingress and egress to and from the interior of a sugar cane field is facilitated and the upright stalks enable the use of harvesting machinery which can harvest the sugar cane without any substantial amount of loss.

With the foregoing and other objects in view, which will be made manifest in the following detailed description and specifically pointed out in the appended claims, reference is had to the accompanying drawing for an illustrative embodiment of the invention, wherein:

According to the present invention the sugar cane is planted in rows in the bottoms of spaced ditches 10 and the cane stalks C are allowed to grow in the conventional manner. As the cane stalks grow and require some height opposed flexible tension elements 11 and 12 are drawn down opposed sides of the row and these tension elements are connected together at spaced intervals through the row by spaced staples or hog rings 13. Any equivalent fastener for fastening the two flexible elements 11 and 12 through the row at spaced intervals may be employed.

The effect of the two flexible elements 11 and 12 together with the fasteners or hog rings 13 is to divide the cane stalks C composing each row into separated groups which are more or less bound together so that the cane stalks of each group tend to mutually cooperate in maintaining each other upright and against toppling. The flexible elements 11 and 12 are preferably formed of a burnable heavy cord although the hog rings 13 may be formed of bendable metal that can be clinched by an applying device or stapler, not shown.

Figure 1:
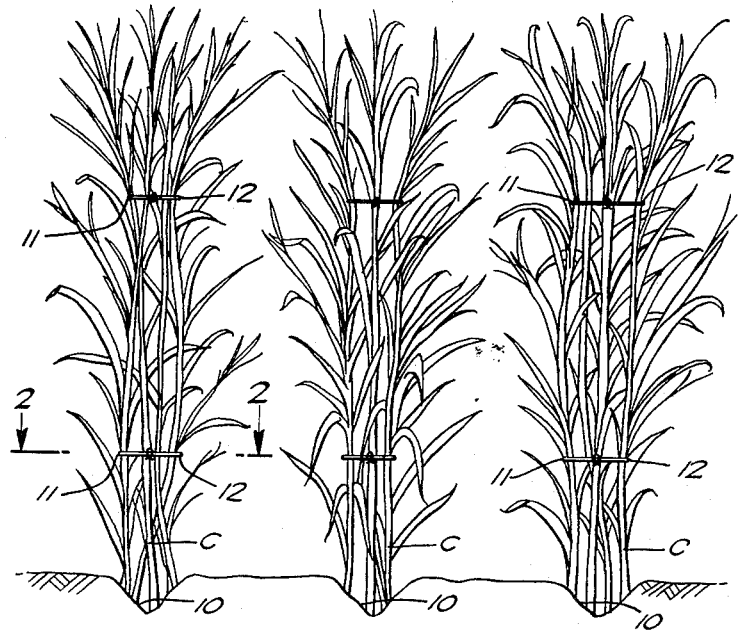
FIGURE 1 is a view in end elevation of some rows of sugar cane stalks which are maintained in the course of growth in an upright position in accordance with the present invention.
Figure 2:
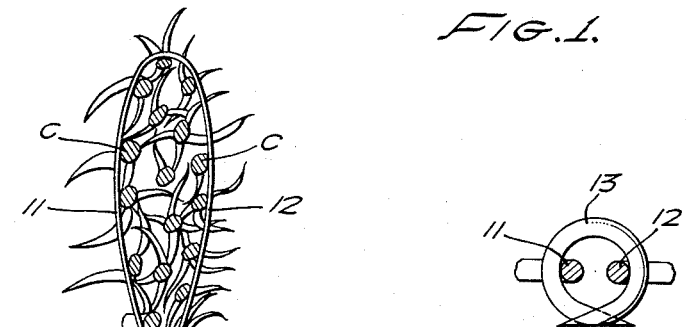
FIG. 2 is a horizontal section taken substantially upon the line 2—2 upon FIG. 1.
Figure 3:
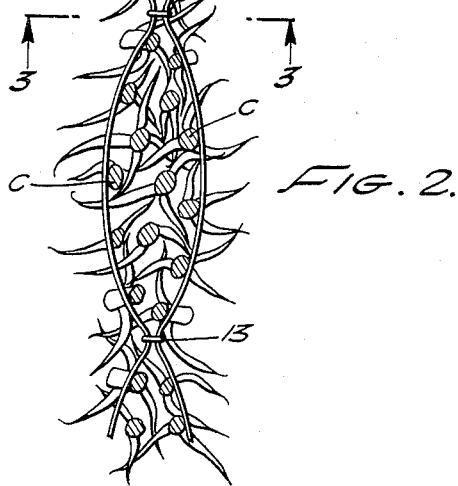
FIG. 3 is a vertical section taken substantially upon the line 3—3 upon FIG. 2.

I have illustrated on FIG. 1 that a lower pair of flexible elements has been applied to opposite sides of each row near the bottoms of the cane stalks C and that a second pair of flexible elements has been applied to opposite sides of the row near the tops of the cane stalks, or when the sugar cane has reached a more advanced growth. It is not necessary in all instances to apply both sets of opposed flexible elements. On the contrary, a single pair of opposed flexible elements may be applied to each row when the cane is in the neighborhood of 6' high. When two pairs of flexible elements are applied to each row as illustrated it is frequently desirable to have the hog rings or fasteners 13 of the upper pair in vertical alignment with the hog rings or fasteners 13 of the lower pair but this arrangement is not essential.

At the time that the sugar cane is ready for harvest conventional practice requires that the cane field be burned over. That is, the foliage on the cane stalks is burned primarily for the purpose of removing it from the stalks. In accordance with the present invention the cane field is burned in the conventional manner, and in the course of the burning as the flexible elements 11 and 12 are of burnable material, these elements will be burned along with the burning foliage thus releasing the stalks composing each of the groups. The stalks, when released, are of course then free to fall or topple over but usually they will remain in an upright position even though released during the short period of time between the burning and the harvesting of the sugar cane. When the stalks remain upright they do not interfere with the use of harvesting machinery but facilitate a complete harvesting of the cane with a minimum amount of loss.

It will be appreciated that the flexible elements may be applied to the rows of sugar cane with a minimum amount of labor. Even if performed manually, two men may carry and draw the flexible cords 11 and 12 along opposite sides of a selected row and a third man may follow them and apply the staples or hog rings 13 at spaced intervals. While there is some increase in expense in the method of growing the sugar cane, this is more than compensated for by the increased production resulting from a reduced loss at the time of harvest heretofore occasioned by the fallen or toppled sugar cane stalks.

Various changes may be made in the details of construction without departing from the spirit and scope of the invention as defined by the appended claims.

I claim:

1. The method of growing and harvesting sugar cane which includes the step of applying flexible elements to opposite sides of a single row of sugar cane, during the growth of the cane stalks, bringing said elements toward each other and connecting said elements through the row at spaced intervals thus binding cane stalks together in groups of stalks which mutually cooperate in each group to maintain each other upright.

2. The method of growing and harvesting sugar cane which includes the step of applying flexible elements to opposite sides of a single row of sugar cane during the growth of cane stalks, connecting said elements through the row at spaced intervals thus binding cane stalks together in groups of individual stalks, the stalks of each group mutually cooperating to maintain each other upright, and removing said elements immediately prior to the time of harvest so as to free each stalk from the others.

3. The method of growing and harvesting sugar cane which includes the step of applying burnable flexible elements to opposite sides of a row of sugar cane during the growth of the cane stalks, connecting said elements through the row at spaced intervals to bind cane stalks together in groups, the stalks of which mutually cooperate to maintain each other upright, and burning said elements at the time that the foliage of the sugar cane is burned in preparation for harvest.

4. The method of growing and harvesting sugar cane which includes the step of dividing the stalks of each row into groups, enclosing each group with a burnable, flexible element so as to cause the stalks of each group to mutually cooperate to maintain each other upright, burning the foliage on the cane stalks immediately prior to harvest and in the course thereof burning the burnable, flexible elements so as to release the stalks of each group immediately prior to the time of harvest.

References Cited in the file of this patent

UNITED STATES PATENTS 2,037,137     Leslie _____ Apr. 14, 1936

FOREIGN PATENTS 481,992     France _____ Nov. 14, 1916

OTHER REFERENCES

Publication: "Cane Sugar Handbook" (Spencer), Eighth, edition, published in 1945 by John Wiley & Sons (N.Y.), page 16 relied on.